April 28, 1936.  R. DÜRR  2,039,152
ADJUSTABLE BEARING
Filed Jan. 31, 1935
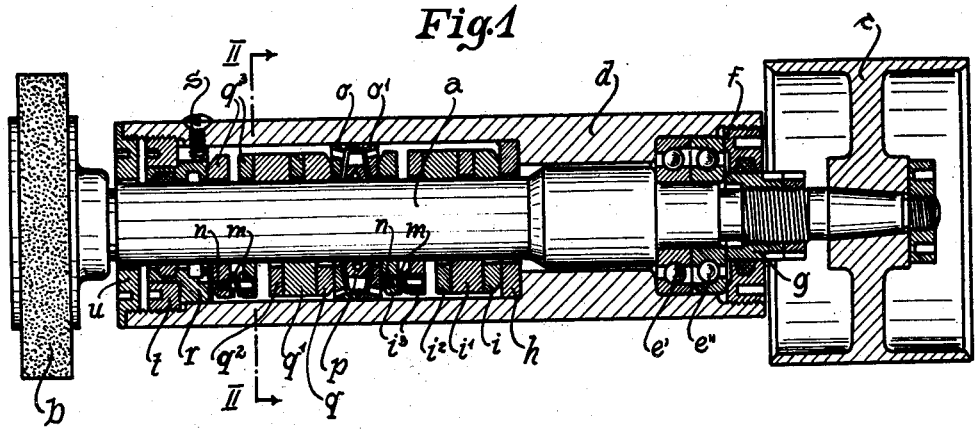
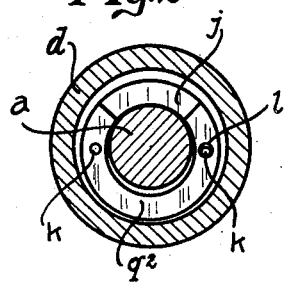 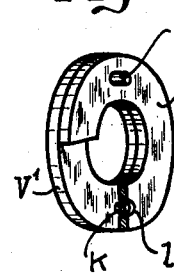 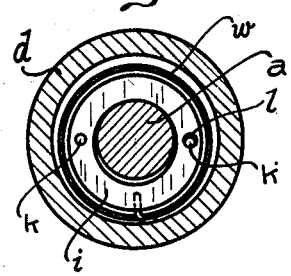
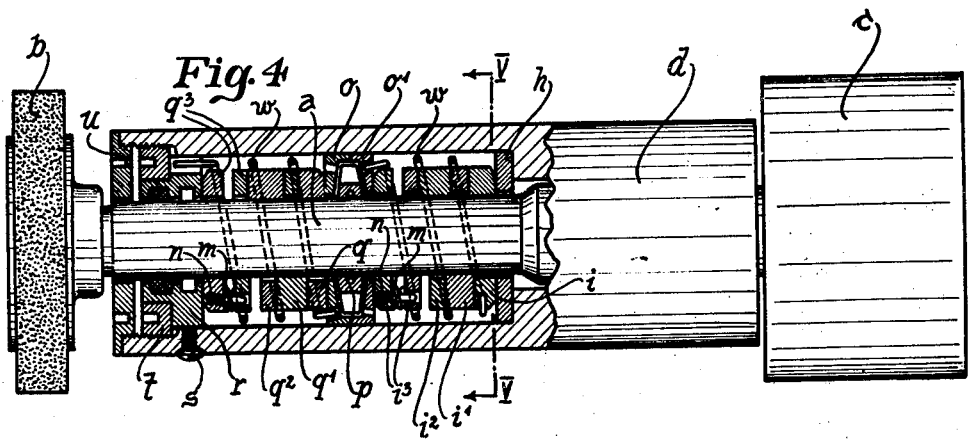
Inventor:
Richard Dürr
by Lowa & Kellenbeck
Attorneys

UNITED STATES PATENT OFFICE 2,039,152

ADJUSTABLE BEARING

Richard Dürr, Dessau-Alten, Germany, assignor to Mayer & Schmidt Schleifmaschinen- und Schmirgelwerke A.-G., Offenbach-on-the-Main, Germany, a corporation of Germany Application January 31, 1935, Serial No. 4,227

6 Claims. (Cl. 308—35)

The present invention relates to an adjustable bearing which, in the first place, is suitable for high speed shafts as for instance grinding spindles, but also for all other particular purposes, where an exact, reliable and continually play-free run of a shaft is required. The bearing according to the invention excels by its extraordinary simplicity of adjustment, its insensibility against radial and axial strain and its durability resulting therefrom. Moreover a special embodiment of the invention is provided, wherein the adjustment is continually and automatically effected.

The invention consists of the provision of a double bearing of the shaft: the one bearing may consist of a ball bearing of known type, suitably applied near to the end of the shaft that carries the belt pulley or the like. The purpose of this bearing is to offer adequate resistance to the axial bearing pressure, which may be effected in known manner by the use of "shoulder"-bearings or equivalent means. In some cases it may suffice, if the said bearing prevents longitudinal displacements of the shaft only in one direction, but it is preferable and to be urgently recommended, more especially in the case of grinding spindles, that such bearing be operative equally in both directions.

The second bearing has for its purpose simply to secure the exact run of the shaft in radial direction. For that purpose this bearing consists of a plurality of annular discs that surround the shaft with a comparatively large play and are mounted within a housing, wherein they have as well a certain freedom of movement. All the annular discs are provided each with an aperture as well as with a projecting pin that engages in the corresponding aperture provided eccentrically in the adjacent disc; thus all the said discs are coupled together. The pins and coupling apertures of the whole arrangement are, however, not disposed all in the same plane, but offset from disc to disc, preferably by 180°. If the first of the said rings of an assembly or bearing with respect to the last ring of the same assembly or bearing be slightly rotated, all the annular rings of that assembly or bearing are slightly rotated with respect to one another. Since that rotation is produced eccentrically, certain parts of the inner borings of the single discs are urged against the shaft. The amount of play between shaft and bearing can thus be adjusted at will simply by rotation of the bearing rings of the respective assembly. This adjustment can also be continually and automatically effected, if the first and last ring of a disc assembly be connected by a suitably tightened screw or helical spring, which continually tries to rotate these rings against one another in that direction by which a firmer contact of the interconnected rings with the shaft is urged. In both cases (more especially, however, in the first mentioned case) the ring discs of an assembly after having reached a certain desired adjustment, by any particular means are secured against any unintended rotation or displacement, preferably by a pressure screw operating parallel to the axis of the shaft and pressing ring discs together.

Apart from the said adjustable ring discs of that second part of the bearing, it is advisable to arrange at least on both ends of each disc assembly one special disc or ring, which with normal play is executed unadjustable both with respect to the shaft as well as to the inner surface of the housing, thus constituting a general centering device of the bearing. Such rings may also be inserted between the adjustable ring discs, but in such a case they are also to be suitably provided with pins and apertures for coupling with the adjacent ring discs.

Lubricating devices may with advantage be mounted into the adjustable or unadjustable ring discs. As a rule, this is not absolutely necessary, since on account of the eccentrical position of the single ring discs in respect to the shaft, small crescent shaped crevices are formed between the shaft and the annular discs, which ensure an excellent lubricating efficiency.

If it be desired to have the surface of contact between the inner borings of the adjustable ring discs and the shaft as large as possible, it is advisable to provide the ring discs at part of their circumference i. e. adjacent to their bearing region, with projections in the form of steps protruding in the direction of the axis. On account of the alternate offset of the rings, their bearing parts, widened by the projections, alternate then on the various sides of the shaft with the corresponding thinner non-bearing parts of the discs.

Several embodiments of the invention are illustrated by way of example in the drawing, in which Fig. 1 shows a longitudinal section through a bearing of a grinding spindle, Fig. 2 shows a cross section along line II—II in Fig. 1 and shows one of the bearing rings in plan view, Fig. 3 shows a perspective view and partial cross section of two bearing rings, executed without the projections shown in Figs. 1 and 2, Fig. 4 shows, in a view similar to Fig. 1, a longitudinal section through another form of the bearing, with which the mutual rotation of the adjustable annular discs is effected automatically by means of a screw spring, Fig. 5 shows the corresponding cross section along line V—V in Fig. 4 and shows in what manner the said spring is anchored to one of the annular discs.

According to Figs. 1 and 2 the bearing of a grinding spindle $a$, which at one end is provided with a grinding disc $b$ and at the other end with a belt pulley $c$, consists of a housing $d$ of any desired shape or form, into which, at the end towards the belt pulley, the devices preventing a longitudinal displacement of the shaft are mounted, while at the other end the adjusting means for the exact run of the shaft are arranged.

The first named part of the bearing consists of two ball bearings $e'$ and $e''$, that are "shoulder" bearings and act in opposition to one another. With their resting outer rings they are fitted into the housing $d$ and fixed by a ring screw $f$, but with their inner rotating rings are kept in position on a corresponding ledge or joint of shaft $a$ by a ring nut $g$.

The second shaft bearing, which forms the adjustable guiding for same, is built up as follows: shaft $a$ is at that end of somewhat reduced diameter, while the inner diameter of housing $d$ is somewhat larger in internal diameter, so as to gain room for the mounting of the bearing rings. At the inner end of the enlargement of the boring of the housing a ring disc $h$ is inserted, which with normal play is unadjustable and secured against rotation, and needs no further explanation. Then follows a series of adjustable ring discs $i$, $i^1$, $i^2$, $i^3$. These are shown in that section in which the points of complete contact of their inner borings with the one side of the shaft $a$ respectively the points of greatest distance of their inner borings from the opposite side of the shaft are situated. It will thus be seen that at the various places of contact which are the supporting regions of that part of the bearing, the ring discs $i$, $i^1$, $i^2$ on account of their lateral projections have their greatest width, measured parallel to the axis of the shaft. Fig. 2 shows the exact form of the said projections, which have the shape of a ring sector $j$. The annular discs $i$, $i^1$, $i^2$, $i^3$ are provided each with a coupling pin $k$ respectively with a coupling aperture $l$, which are offset by about 90 degrees with respect to the said enlargments $j$. These pins and apertures can, of course, not be seen in the section of Fig. 1. In Fig. 2 it will be seen that in coupling aperture $l$ of the shown ring disc $q^2$ the pin $k$ of the next following disc $q^1$ is engaged. Similarly the first ring $i$ of that assembly is coupled with the end disc $h$. The first ring $i$ has, for reasons easily to be understood, contrary to the next ring $i^1$, $i^2$, to be formed unsymmetrically. This equally applies to the last ring $i^3$ of that assembly. As will be seen from Fig. 1 this ring may with advantage be composed of two discs, which by a pressure spring $m$ are supporting one another and secured against reciprocal displacement by a pin coupling $n$.

After ring $i^3$ follows an intermediate ring that serves, as far as the adjustment of the bearing is concerned, only as a means of transmission. This ring is composed of two equal halves $o$, $o^1$, which are as well secured against mutual displacement. They form two concave shells facing one another and surround a slinger wheel or the like $p$ fixed between them on the shaft $a$ and serving as lubricating device. By suitably arranged apertures in the discs $o$, $o^1$, the lubricant is kept in circulation within the bearing. The discs $o$, $o^1$ are coupled with the ring disc $i^3$ in the same manner as the discs $i$ to $i^3$ among one another. Thus a rotation of disc $o$ operates also the adjustment of the bearing as described above.

The adjustment is, however, with the example given, not effected immediately by operating the disc $o$, but in front of this disc a second set of adjustable ring discs $q$, $q^1$, $q^2$, $q^3$ is arranged corresponding in all details with the discs $i$, $i^1$, $i^2$, $i^3$. The actual adjustment ring $r$ is coupled with the ring $q^3$. It may be kept in the desired position by a lateral pressure screw $s$. By special screw ring $t$ which fits an inner thread of the housing $d$, all the rings situated between the discs $r$ and $h$ may be firmly pressed together and thereby secured against undesired displacement. A general locking disc $u$ serves as covering of the whole bearing.

Fig. 3 shows that the adjustable bearing rings $i$ to $i^2$ and $q$ to $q^2$ respectively may also be provided without the enlargements $j$. The discs $v$, and $v'$ are slightly simpler to produce, but in that case a greater number of discs is required for a certain length of bearing, than if the discs described in Figs. 1 and 2 are being used. But even in using in such a case a greater number of flat discs, $v$, $v'$, the bearing surface will in no way be increased, but rather diminished.

Figs. 4 and 5 need no special description, since the analogous parts have the same reference letters as in Figs. 1 and 2, with the only difference that the end disc $h$ is connected with the intermediate ring $o^1$ and similarly the intermediate ring $o$ is connected with ring $r$ (described in Fig. 1 as adjusting ring) by a coil spring $w$ surrounding the outside of each of the ring assemblies. If on mounting the spring $w$ this spring is tightened in the one or other direction of turning, prior to its one end being hung into ring $o^1$ or $r$ respectively, it will constantly endeavour to wrench the ring assembly which it surrounds, effecting thereby a continuous automatic adjustment of the bearing. It is left to the experience of the users, whether also in this execution of the bearing according to the invention the whole ring assembly shall be fixed, by tightening of the fixing ring $t$, in certain adjustments, whereby naturally the effect of the springs $w$ is eliminated; only when the screw $t$ is loosened, they again enter into action. The same applies to pressure screw $s$. It may happen, however, that temporarily for the executing of some particular work the adjustment of a specially narrow play in a bearing as effected by the springs $w$ shall intentionally be done away with. This may be effected by turning backwards and tightening of the ring $r$.

The same effect as that resulting from the arrangement as described above and shown in Figs. 4 and 5 will obviously be obtained, if only one end of the said tension spring is anchored to one of the ring discs, while the other end is anchored to an opposite point of the housing. No special illustration in construction is deemed to be necessary.

I wish it to be understood that I do not desire to be limited to the exact details of construction shown and described, for obvious modifications will occur to a person skilled in the art.

I claim:

1. An adjustable bearing, especially suitable for high speed shafts, consisting of a housing, a shaft, one bearing adapted to prevent a longitudinal displacement of the shaft at least in one direction and preferably being constructed as a ball bearing, and another bearing adapted to effect an exact guiding of the shaft and being composed of a plurality of annular discs rotatably disposed within said housing, the majority of said discs having a relatively large play with respect both to the shaft and to the inner surface of the housing, and means comprising pins and co-operating apertures for coupling all of the discs together in a manner to permit said discs to be rotated eccentrically with respect to each other and to the shaft until the desired play in the bearing is obtained.

2. An adjustable bearing according to claim 1, characterized by the fact that the rotatably adjustable annular discs are arranged near that end of the shaft from which energy or work is to be taken off.

3. An adjustable bearing, according to claim 1, characterized by the fact that for effecting the mutual rotation of the annular discs an adjusting means, preferably of ring shaped form, is arranged within the said housing and is coupled with the extreme ring disc of the adjustable ring disc assembly.

4. An adjustable bearing, according to claim 1, characterized by the fact that for effecting the mutual rotation of the annular discs a coil spring is arranged within the said housing and interconnects under tension the last and the first ring discs of a series of the said adjustable ring discs, the said spring connection being adapted to automatically effect an eccentric rotation of the discs.

5. An adjustable bearing according to claim 1, characterized by the fact that for effecting the mutual rotation of the annular discs a coil spring is arranged within the said housing and interconnects under tension one of the said adjustable ring discs with an opposite point of the housing, the said spring connection being adapted to automatically effect an eccentric rotation of the discs.

6. An adjustable bearing according to claim 1, characterized by the fact that at least part of the total number of the said adjustable ring discs is provided, adjacent to their bearing region, with projections extending parallel to the shaft on a minor portion of its circumference for the purpose of increasing the total bearing surface.

RICHARD DÜRR.